UNITED STATES PATENT OFFICE.

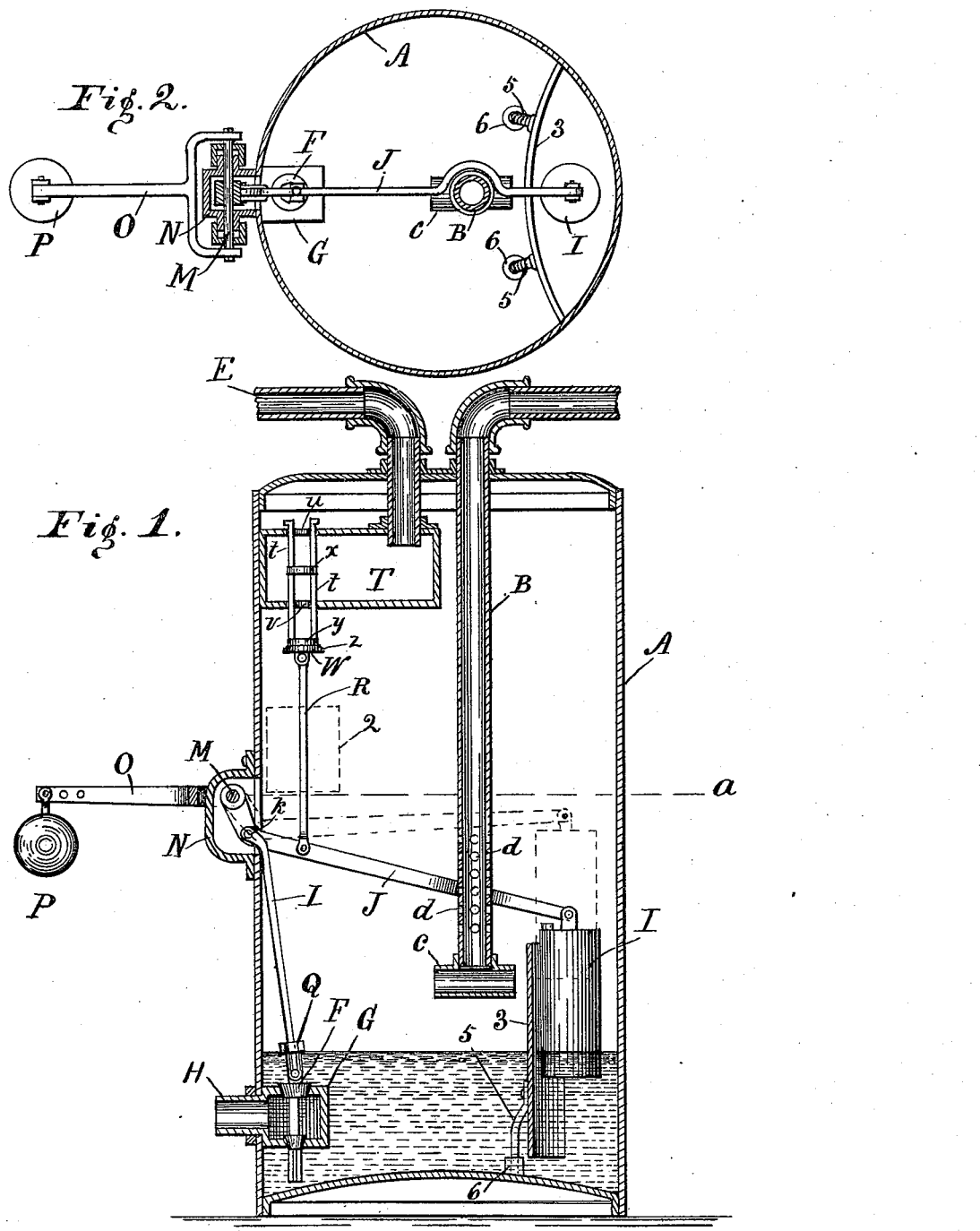

WILLIAM MOORE, OF KOKOMO, INDIANA.

APPARATUS FOR SEPARATING LIQUIDS FROM NATURAL GAS.

SPECIFICATION forming part of Letters Patent No. 428,399, dated May 20, 1890.

Application filed December 16, 1889. Serial No. 333,919. (No model.)

*To all whom it may concern:*

Be it known that I, WILLIAM MOORE, a citizen of the United States, residing at Kokomo, in the county of Howard and State of Indiana, have invented a new and useful Improvement in Apparatus for Separating Liquids from Natural Gas, of which the following is a specification.

My invention relates to an improved apparatus for separating from natural gas the liquids and other impurities which are usually found in mechanical combination therewith as the gas flows from the well. This has heretofore been accomplished by means of a closed reservoir adapted to receive the mingled gas, water, and oil as it flows from the well, and having near the bottom a trap-valve which is controlled by means of a float and lever arranged within the reservoir, the arrangement being such that the liquids carried with the gas are collected in the bottom of the reservoir and are automatically discharged, when a certain quantity has accumulated, by the float raising the valve, the gas passing off continuously from the upper part of the reservoir.

It has been found in practice that in many gas-wells there is a great variation in the amount of liquids discharged in a given time by the same well, the ordinary flow, which is easily discharged through the trap-valve, being interrupted by the flow of a large volume of water, which is so much greater than the capacity of the trap-valve that the reservoir and the gas-pipes leading therefrom become filled with water, thus practically cutting off the flow of gas.

The objects of my improvement are, first, to prevent the flooding of the gas-pipes which lead from the reservoir; second, to provide means whereby the relation of the float to the trap-valve may be so adjusted that a greater or less movement of the float will be required to lift the valve, and, third, to provide means for protecting the float from violent disturbances by the incoming gas and water, all as hereinafter fully set forth.

The accompanying drawings illustrate my invention.

Figure 1 represents a central vertical section. Fig. 2 represents a plan at $a$, Fig. 1.

A is the reservoir.

B is the inlet-pipe leading from the gas-well. Pipe B extends downward inside the reservoir about two-thirds of its depth, and its lower end is partly closed by a T-coupling $c$. For the purpose of permitting the gas to separate easily from the water or other liquids carried by it that portion of the pipe B immediately above the lower end is perforated, as at $d\ d$.

E is a pipe through which the gas passes out of the reservoir.

F is a partially-balanced valve arranged to seat in the hollow casing G, which terminates in the discharge-pipe H. Valve F is connected with a float I by means of the lever J and connecting-rod L. The fulcrum of lever J is a short shaft M, mounted in a casing N, secured to the side of the reservoir. Float I being of that class which consists of a hollow sheet-metal vessel filled with liquid and having an opening at one end through which the gas or vapor in which it is suspended may have access to the float, it is necessary to counterbalance the float, and for this purpose the lever O, carrying the counter-weight P, is attached to one end of shaft M.

For the purpose of adjusting the relative movement required in the float I to raise the valve F lever J is bent as shown at the point $k$, where the connecting-rod L is pivoted to it, and the connecting-rod is made adjustable as to length by means of a screw-threaded socket or coupling Q, screwed onto the lower end of the rod and pivoted to the valve. If it is desired that it shall require a long upward and correspondingly-powerful movement of the float to raise the valve, the rod is shortened until the point of the connection of the lower end of coupling Q to the valve, the pivot $k$, and the fulcrum M are nearly in line, when the valve F is closed, as shown in full lines, Fig. 1. If a shorter and less powerful movement of the float is required, the connecting-rod is lengthened, so as to bring the lever, when the valve is closed, into the position shown in the dotted lines, Fig. 1.

For the purpose of preventing the flooding of the gas-outlet pipe E in case a great amount of liquid should be suddenly thrown into the reservoir, I extend the pipe E within the reservoir into a chamber T, which communicates with the interior of the reservoir through openings $u$ and $v$, which are closed by the balanced valve W. Valve W consists, preferably, of two disks $x$ and $y$, adapted to fit nicely into the openings $u$ and $v$, and connected by guide-bars $t$ in the usual well-known manner. Disk $y$ is provided with an annular shoulder $z$, which engages the under side of chamber T and limits the upward movement of the valve. Bars $t$ are extended above the disk $x$ and are turned outward at the top, so as to engage the top of chamber T, and thus limit the downward movement of the valve. From the bottom of valve W, which stands normally open, as shown, is suspended by a connecting-rod R a float, which operates to close the valve when the water in the reservoir rises to an extraordinary height. Said float may be especially for this purpose, and may be attached directly to the rod R, as shown in dotted lines at 2; or the rod may be connected, as shown in full lines, to lever J, and through it to the same float I which operates the water-discharge valve F. I prefer the latter method.

For the purpose of protecting the float I, I provide a curved partition 3, which is removably supported between the inlet-pipe B and the float by means of standards 5 5, fastened to the partition and inserted in sockets 6 6, formed in the bottom of the reservoir. Said standards project a short distance below the lower edge of the partition, so as to permit a flow of water beneath the partition.

In operation, the mingled gas and liquid as it flows from the well having been admitted to the reservoir through pipe B, the liquid falls to the bottom of the reservoir and the gas passes out of the top through the openings $u$ and $v$ into chamber T, and thence through the pipe E to the gas-mains. When sufficient water has accumulated in the reservoir so that the buoyant force of float I overcomes the pressure on the valve F, the necessary amount of which force may be regulated by the relative position of pivot $k$, as before explained, the valve is raised and the water flows out until the float resumes its normal position and the valve is closed.

The ordinary movements of the water in the reservoir do not operate to close valve W sufficiently to interfere materially with the flow of the gas through chamber T; but in case of an extraordinary and sudden influx of water, so that the water flows into the reservoir faster than it can flow out through the open valve F, the float, rising beyond its usual point, raises valve W until the openings $u$ and $v$ are closed, and the escape of gas from the reservoir being thus cut off the water is prevented from reaching the gas-outlet pipe, and is driven out through the discharge-pipe H by the accumulated gas-pressure in the reservoir with great velocity until the normal level is reached, when the valve W is again opened by the falling of the float with which it is connected.

It will be observed that the arrangement of the outlet-pipe E, chamber T, and valve W is such that the gas-pressure is exerted in opposite directions on the valve, so that as soon as the water recedes the valve cannot be held to its seat by the gas-pressure, and the automatic reopening of the gas-outlet is assured.

I claim as my invention—

1. In an apparatus for separating liquids from natural gas, the combination, with the reservoir adapted to receive the combined gas and liquids and provided with a lower discharge-opening for the liquid and an upper discharge-opening for the gas, of a normally-closed valve arranged in the lower discharge-opening, a closed chamber arranged to include the upper discharge-opening and having a passage communicating with the interior of the reservoir, a normally-open balanced valve arranged in said passage, a float connected with the lower valve, and a float connected with the upper valve, all being arranged substantially as shown and described, whereby the lower valve is first opened by the rising of the liquid in the reservoir and the upper valve is then closed by the further rising of said liquid, substantially as and for the purpose set forth.

2. In an apparatus for separating liquids from natural gas, the combination of the reservoir, the casing G, communicating with the lower part of the reservoir and provided with the discharge-valve F and discharge-pipe H, chamber T, communicating with the upper part of the reservoir and having valve W and discharge-pipe E, lever J, pivoted to the reservoir, connecting-rods L and R, connecting the valves F and W with the lever, and float I, all arranged to co-operate substantially as specified.

3. In an apparatus for separating liquids from natural gas, the combination of the reservoir having a water-discharge opening, the valve F, arranged to close said opening, the bent lever J, pivoted at one end to the reservoir and having at the other end a float I, and the longitudinally-extensible connecting-rod L, pivoted to the lever at the bend therein and arranged to connect the lever with the valve, all arranged to co-operate as specified, whereby the relation of the float to the valve is adjusted, as and for the purpose set forth.

4. In an apparatus for separating liquids from natural gas, the combination, with the reservoir, the discharge-valve F, arranged therein, the lever J, pivoted to the reservoir and connected with the valve, and the float attached to the lever, of the removable partition 3, having standards 5 5, arranged to enter sockets 6 6, formed in the bottom of the reservoir, whereby the float is protected, as set forth.

WILLIAM MOORE.

Witnesses:
H. P. HOOD,
V. M. HOOD.